(12) United States Patent
Shimizu et al.

(10) Patent No.: US 8,303,468 B2
(45) Date of Patent: Nov. 6, 2012

(54) POWER TRANSMISSION DEVICE AND VEHICLE HAVING THE SAME

(75) Inventors: Tetsuya Shimizu, Anjo (JP); Kazuhiko Kato, Kariya (JP); Naoyuki Fukaya, Okazaki (JP); Kazunori Ishikawa, Toyota (JP)

(73) Assignee: Aisin Aw Co., Ltd., Anjo (JP)

( * ) Notice: Subject to any disclaimer, the term of this patent is extended or adjusted under 35 U.S.C. 154(b) by 367 days.

(21) Appl. No.: 12/654,624

(22) Filed: Dec. 28, 2009

(65) Prior Publication Data

US 2010/0181159 A1 Jul. 22, 2010

(30) Foreign Application Priority Data

Jan. 19, 2009 (JP) ................................. 2009-008890

(51) Int. Cl.
*F16H 61/26* (2006.01)
(52) U.S. Cl. ...................................... 477/130; 477/158
(58) Field of Classification Search .................... 477/70, 477/79, 127–131, 166, 168, 156, 158, 162; 475/116, 137; 192/48.601, 85.63
See application file for complete search history.

(56) References Cited

U.S. PATENT DOCUMENTS

2009/0232673 A1* 9/2009 Reisch et al. ................. 417/364

FOREIGN PATENT DOCUMENTS

| JP | A-8-178053 | 7/1996 |
| JP | A 2000-45807 | 2/2000 |
| JP | A-2000-046166 | 2/2000 |
| JP | A-2008-180303 | 8/2008 |
| JP | A 2008-536060 | 9/2008 |

OTHER PUBLICATIONS

International Search Report mailed Mar. 16, 2010 for PCT/JP2009/070852.
Jul. 24, 2012 Office Action issued in Japanese Patent Application No. 2009-008890 (English Translation only).

* cited by examiner

*Primary Examiner* — Justin Holmes
(74) *Attorney, Agent, or Firm* — Oliff & Berridge, PLC

(57) ABSTRACT

A power transmission device that includes a clutch that transmits power from a motor to an axle; a first pump that is driven by power from the motor to generate and output fluid pressure; a second pump that receives and is driven by a supply of electric power to generate and output fluid pressure; a pressure regulating valve that regulates a pressure of operation fluid output from the first pump, and delivers at least a portion of operation fluid discharged in connection with the pressure regulation to a lubrication target for use as lubricant; and a switching valve that switches between a first connection state and a second connection state.

7 Claims, 6 Drawing Sheets

FIG.2

|  |  | C1 | C2 | C3 | B1 | B2 | F1 |
|---|---|---|---|---|---|---|---|
| R |  |  |  | ○ |  | ○ |  |
| D | 1st | ○ |  |  |  | (○) | ○ |
|  | 2nd | ○ |  |  | ○ |  |  |
|  | 3rd | ○ | ○ |  |  |  |  |
|  | 4th |  | ○ |  | ○ |  |  |

(○): ENGINE BRAKE IN OPERATION

POWER TRANSMISSION DEVICE AND VEHICLE HAVING THE SAME

The disclosure of Japanese Patent Application No. 2009-008890 filed on Jan. 19, 2009 including the specification, drawings and abstract is incorporated herein by reference in its entirety.

BACKGROUND

The present invention relates to a power transmission device that is installed in a vehicle and provided with a clutch that transmits power from a motor to an axle side, and a vehicle having the power transmission device.

This type of power transmission device conventionally has a first hydraulic pump (mechanical oil pump) that drives based on power from an engine; a manual shift valve that operates in association with a shift operation; a solenoid valve whose input port is connected to the first hydraulic pump through the manual shift valve; a selector valve that is interposed between oil passages and formed as a two-position electromagnetic valve (and includes a check valve), wherein at a first position the selector valve communicates with an oil passage that connects an output port of the solenoid valve to a friction engaging device (clutch) and at a second position the selector valve cuts off this oil passage; and a second hydraulic pump (electromagnetic pump) that directly delivers discharge pressure to the clutch. (See Japanese Patent Application Publication No. JP-A-2008-180303 for an example.) The proposed device can purportedly reduce energy loss and save energy by delivering pressure oil from the first hydraulic pump through the selector valve during operation of the friction engaging device, which requires a large volume of high-pressure oil, and by delivering pressure oil from the second hydraulic pump when holding this device at a predetermined pressure.

SUMMARY

However, a portion of the operation oil discharged from the mechanical oil pump is generally also used for lubricating the clutches, bearing, gears, and the like provided in the power transmission device. The discharge capacity of the mechanical oil pump is therefore designed in consideration of the hydraulic pressure required for maintaining the engine idling speed and for engaging the clutches, as well as for delivering operation oil to lubrication components. In terms of installing the power transmission device in the vehicle, a mechanical oil pump with as low a capacity as possible should be used because of the limited installation space. Therefore, reducing the size of the mechanical oil pump in order to downsize the overall device is an important issue.

A power transmission device and a vehicle having the same of the present invention reduces the size of a pump that operates based on power from a motor for a more downsized device overall.

The power transmission device and the vehicle having the same of the present invention employ the following to achieve the above.

A power transmission device of the present invention is installed in a vehicle. The power transmission includes: a clutch that transmits power from a motor to an axle; a first pump that is driven by power from the motor to generate and output fluid pressure; a second pump that receives and is driven by a supply of power to generate and output fluid pressure; a pressure regulating valve that regulates a pressure of operation fluid output from the first pump, and delivers at least a portion of operation fluid discharged in connection with the pressure regulation to a lubrication target for use as lubricant; and a switching valve that switches between a first connection state, wherein when the first pump is driving, operation fluid output from the pressure regulating valve is supplied to the clutch and operation fluid output from the second pump is supplied as lubricant to the lubrication target while a supply of operation fluid from the second pump to the clutch is cut off, and a second connection state wherein, when the first pump is not driving, the supply of operation fluid from the pressure regulating valve to the clutch is cut off and operation fluid output from the second pump is supplied to the clutch while the supply of operation fluid from the second pump to the lubrication target is cut off.

According to the power transmission device of the present invention, the pressure regulating valve regulates the pressure of operation fluid output from the first pump driven by power from the motor, and delivers at least a portion of operation fluid discharged in connection with the pressure regulation to the lubrication target. The switching valve switches between first and second connection states. In the first connection state, when the first pump is driving, operation fluid output from the pressure regulating valve is delivered to the clutch, and operation fluid output from the second pump is supplied as lubricant to the lubrication target while the supply of operation fluid from the second pump to the clutch is cut off. In the second connection state, when the first pump is not driving, the supply of operation fluid from the pressure regulating valve to the clutch is cut off, and operation fluid output from the second pump is supplied to the clutch while the supply of operation fluid from the second pump to the lubrication target is cut off. Supplying the lubrication target with operation fluid from the second pump that receives and is driven by a supply of power assists the supply of operation fluid from the first pump to the lubrication target. Therefore, a lower capacity pump may be used as the first pump compared to that used when only the first pump supplies operation fluid to the lubrication target. As a consequence, a more compact device overall can be achieved. By driving the second pump while the first pump is stopped in connection with stopping of the motor, the switching valve in the second connection state can apply fluid pressure from the second pump to the clutch. Therefore, when the motor subsequently restarts and the switching valve changes to the first connection state, the clutch can be rapidly engaged to swiftly start power transmission. Here, in addition to including an internal combustion engine capable of an automatic stop and an automatic start, the term "motor" also includes an electric motor. In addition to including an ordinary clutch that connects two rotating systems, the term "clutch" also includes a brake that connects one rotating system to a fixing system such as a case. The term "second pump" includes an ordinary electric pump that is driven by power from an electric motor to generate fluid pressure, as well as an electromagnetic pump or the like that generates fluid pressure by reciprocating a mobile part using electromagnetic force or the biasing force of a spring.

The power transmission device of the present invention described above may further include: a control unit that, while the motor is operating, drivingly controls the second pump such that operation fluid is supplied from the second pump to the lubrication target when a rotation speed of the motor is less than a predetermined value, and stops the second pump when the rotation speed of the motor is equal to or greater than the predetermined value. Thus, the second pump can be efficiently driven.

The power transmission device of the present invention may further include: a fluid transmission device that transmits power using operation fluid inside an operation fluid chamber, wherein the pressure regulating valve may be formed from a first pressure regulating valve that generates a line pressure for engaging the clutch and supplies at least a portion of operation fluid discharged in connection with the line pressure generation to an oil passage connected to the operation fluid chamber, and a second pressure regulating valve that regulates a pressure of operation fluid supplied from the first pressure regulating valve to the oil passage and supplies at least a portion of operation fluid discharged in connection with the pressure regulation to the lubrication target for use as lubricant.

In the power transmission device of the present invention, the switching valve may include a signal pressure input port that is input with operation fluid output from the first pump; a first input port that is input with operation fluid output from the pressure regulating valve; a second input port that is input with operation fluid output from the second pump; a first output port that outputs operation fluid to the clutch; and a second output port that outputs operation fluid to the lubrication target. When fluid pressure is acting on the signal pressure input port, as the first connection state, the first input port may be connected to the first output port, the connection between the second input port and the first output port cut off, and the second input port connected to the second output port. When fluid pressure is not acting on the signal pressure input port, as the second connection state, the connection between the first input port and the first output port may be cut off, the second input port connected to the first output port, and the connection between the second input port and the second output port cut off. Thus, switching between the connection states can be performed using only one switching valve. Therefore, a more compact device can be achieved compared to using two or more switching valves for switching between the connection states.

A vehicle of the present invention is installed with a motor and a power transmission device of the present invention of any of the modes described above. Namely, the vehicle is basically installed with a power transmission device having a clutch that transmits power from the motor to an axle. The power transmission further includes: a first pump that is driven by power from the motor to generate and output fluid pressure; a second pump that receives and is driven by a supply of power to generate and output fluid pressure; a pressure regulating valve that regulates a pressure of operation fluid output from the first pump, and delivers at least a portion of operation fluid discharged in connection with the pressure regulation to a lubrication target for use as lubricant; and a switching valve that switches between a first connection state, wherein when the first pump is driving, operation fluid output from the pressure regulating valve is supplied to the clutch and operation fluid output from the second pump is supplied as lubricant to the lubrication target while a supply of operation fluid from the second pump to the clutch is cut off, and a second connection state wherein, when the first pump is not driving, the supply of operation fluid from the pressure regulating valve to the clutch is cut off and operation fluid output from the second pump is supplied to the clutch while the supply of operation fluid from the second pump to the lubrication target is cut off.

The vehicle of the present invention is installed with the power transmission device of the present invention of any of the modes described above. Therefore, effects achieved by the power transmission of the present invention, for example, an effect of a more compact device overall and an effect of rapidly engaging the clutch at restarting of the motor after an automatic stop to swiftly start power transmission, can be achieved by the vehicle of the present invention.

BRIEF DESCRIPTION OF THE DRAWINGS

FIG. 2 is an explanatory drawing that shows an operation chart of an automatic transmission 30 provided in the power transmission device 20;

DETAILED DESCRIPTION OF EMBODIMENTS

Next, an embodiment will be used to describe a best mode for carrying out the present invention.

Figure 1:
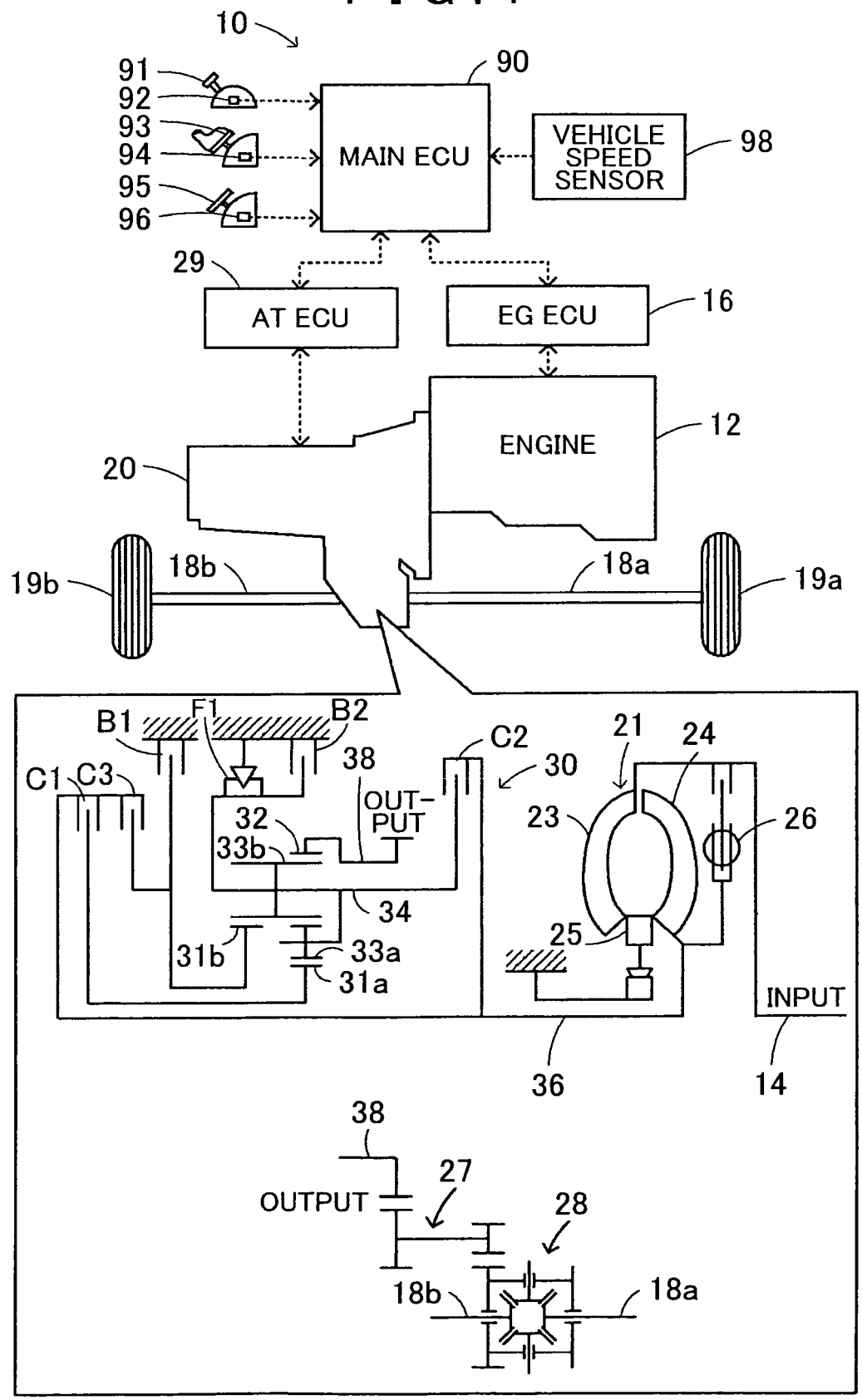
FIG. 1 is a structural diagram that shows an outline of the constitution of an automobile 10 incorporated with a power transmission device 20 serving as an embodiment of the present invention.
Figure 3:
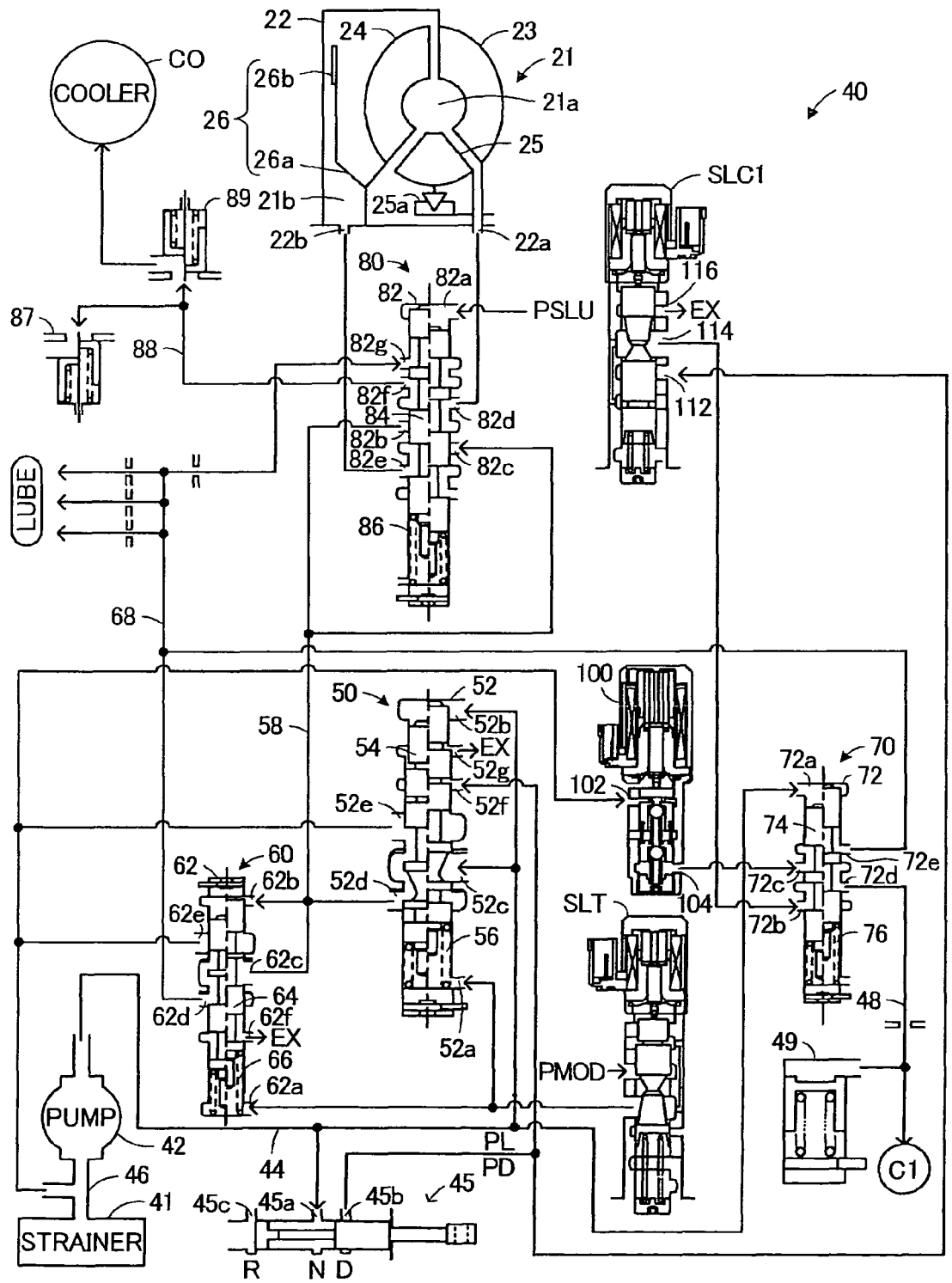
FIG. 3 is a structural diagram that shows an outline of the constitution of a hydraulic circuit 40.

FIG. 1 is a structural diagram that shows an outline of the constitution of an automobile 10 incorporated with a power transmission device 20 serving as an embodiment of the present invention. FIG. 2 is an explanatory drawing that shows an operation chart of an automatic transmission 30 provided in the power transmission device 20. FIG. 3 is a structural diagram that shows an outline of the constitution of a hydraulic circuit 40 that drives the automatic transmission 30.

As FIG. 1 shows, the automobile 10 of the present embodiment includes an engine 12, an engine electronic control unit (engine ECU) 16, and a power transmission device 20. The engine 12 is an internal combustion engine that outputs power by explosive combustion of a hydrocarbon fuel such as gasoline or diesel. The engine ECU 16 is input with various signals such as an engine speed Ne from a rotation speed sensor that detects the rotation speed of the engine 12, and operates and controls the engine 12. The power transmission device 20 of the embodiment is connected to a crankshaft 14 of the engine 12, as well as axles 18a, 18b of right and left wheels 19a, 19b, and transmits power from the engine 12 to the axles 18a, 18b.

As FIG. 1 further shows, the power transmission device 20 of the embodiment is formed as a transaxle device that transmits power from the engine 12 to the right and left axles 18a, 18b, and includes a torque converter 21, a mechanical oil pump 42, the automatic transmission 30, the hydraulic circuit 40, an automatic transmission electronic control unit (AT ECU) 29, and a main electronic control unit 90. The torque converter 21 has a lock-up clutch and is connected to the crankshaft 14 of the engine 12. The mechanical oil pump 42 (see FIG. 3) is disposed downstream of the torque converter 21 and pressure feeds operation oil based on the power from the engine 12. The automatic transmission 30 is staged and driven by hydraulic pressure. In addition, the automatic transmission 30 has an input shaft 36 connected to the torque converter 21 and an output shaft 38, which is connected to the axles 18a, 18b through a gear mechanism 27 and a differential gear 28. The automatic transmission changes the speed of power input to the input shaft 36, which it then outputs to the output shaft 38. The hydraulic circuit 40 is an actuator that drives the automatic transmission 30. The AT ECU 29 controls the automatic transmission 30 (hydraulic circuit 40). The main electronic control unit 90 controls the vehicle overall. Note that the main electronic control unit 90 is input with a shift position SP from a shift position sensor 92 that detects an operation position of a shift lever 91; and accelerator opening Acc from an accelerator pedal position sensor 94 that detects a depression amount of an accelerator pedal 93; a brake switch signal BSW from a brake switch 96 that detects depression of a brake pedal 95; and a vehicle speed V from a vehicle speed sensor 98. The main electronic control unit 90 is also connected to the engine ECU 16 and the AT ECU 29 through communication ports, and exchanges various control signals and data with the engine ECU 16 and the AT ECU 29.

As shown in FIGS. 1 and 3, the torque converter 21 has a pump impeller 23 that is connected to the crankshaft 14 of the engine 12 through a converter cover 22; a turbine runner 24 that is connected to the input shaft 36 of the automatic transmission 30, and disposed facing the pump impeller 23; and a stator 25 that is disposed between the pump impeller 23 and the turbine runner 24, and has a one-way clutch 25a that only permits rotation in one direction. Using operation oil inside a converter chamber 21a formed from the converter cover 22, the pump impeller 23 converts engine torque into a flow of operation oil, and the turbine runner 24 converts this operation oil flow into torque for the input shaft 36, whereby the torque converter 21 transmits torque. In addition, a single disc lock-up clutch 26 built into the torque converter 21 locks up the pump impeller 23 and the turbine runner 24. The single disc lock-up clutch 26 is formed from a clutch piston 26a and a clutch plate 26b. The clutch piston 26a forms a lock-up chamber 21b, which is defined with respect to the converter chamber 21a. The clutch plate 26b is in spline engagement with the clutch piston 26a and a surface of the clutch plate 26b has a friction member attached. The difference in hydraulic pressure inside the converter chamber 21a and hydraulic pressure inside the lock-up chamber 21b causes fixing of the clutch plate 26b to achieve a lock-up state, or releases fixing of the clutch plate 26b to achieve a lock-up release state. The torque converter 21 is also formed with a converter chamber port 22a for inputting and outputting operation oil to and from the converter chamber 21a, and a lock-up chamber port 22b for inputting and outputting operation to and from the lock-up chamber 21b.

As shown in FIG. 1, the automatic transmission 30 has a Ravigneaux type planetary gear mechanism; three clutches C1, C2, C3; two brakes B1, B2; and a one-way clutch F1. The Ravigneaux type planetary gear mechanism has two sun gears 31a, 31b with external teeth; a ring gear 32 with internal teeth; a plurality of short pinion gears 33a that mesh with the sun gear 31a; a plurality of long pinion gears 33b that mesh with the sun gear 31b and the plurality of short pinion gears 33a, and also mesh with the ring gear 32; and a carrier 34 that is connected to and also rotatably and revolvably holds the plurality of short pinion gears 33a and the plurality of long pinion gears 33b. The sun gear 31a is connected to an input shaft 36 through the clutch C1. The sun gear 31b is connected to the input shaft 36 through the clutch C3, and the rotation of the sun gear 31b is permitted or held stationary by the brake B1. The ring gear 32 is connected to an output shaft 38. The carrier 34 is connected to the input shaft 36 through the clutch C2. The rotation of the carrier 34 is restricted to one direction by the one-way clutch F1, and also permitted or held stationary by the brake B2, which is provided in parallel with the one-way clutch F1.

As shown in FIG. 2, the automatic transmission 30 can switch among first to fourth forward speeds and one reverse speed by engaging and disengaging the clutches C1 to C3 and the brakes B1, B2. The reverse speed is formed by engaging the clutch C3 and the brake B2, and disengaging the clutches C1, C2 and the brake B1. The first forward speed is formed by engaging the clutch C1, and disengaging the clutches C2, C3 and the brakes B1, B2. In the first forward speed, the brake B2 is engaged instead of the one-way clutch F1 during engine braking. The second forward speed is formed by engaging the clutch C1 and the brake B1, and disengaging the clutches C2, C3 and the brake B2. The third forward speed is formed by engaging the clutches C1, C2 and disengaging the clutch C3 and the brakes B1, B2. The fourth forward speed is formed by engaging the clutch C2 and the brake B1, and disengaging the clutches C1, C3 and the brake B2.

Engaging and disengaging of the clutches C1 to C3 and the brakes B1, B2 of the automatic transmission 30 is performed by the hydraulic circuit 40. As shown in FIG. 3, the hydraulic circuit 40 includes: a primary regulator valve 50, a secondary regulator valve 60, a linear solenoid SLT, a manual valve 45, a linear solenoid SLC1, an electromagnetic pump 100, a switching valve 70, a lock-up relay valve 80, a cooler CO, and a bypass valve 87. The primary regulator valve 50 regulates the pressure of operation oil pressure fed from the mechanical oil pump 42, which is driven by power from the engine 12, through a strainer 41 to generate a line pressure PL. With the generation of the line pressure PL, at least a portion of the operation oil is delivered to an oil passage 58. The secondary regulator valve 60 regulates the pressure of operation oil delivered to the oil passage 58 from the primary regulator valve 50 to generate a secondary pressure PS. With the generation of the secondary pressure PS, at least a portion of the operation oil is delivered to a lubricating oil passage (LUBE) 68. The linear solenoid SLT regulates a modulator pressure PM that was generated from the line pressure PL through a modulator valve (not shown), and outputs the modulator pressure PM as a signal pressure to drive the primary regulator valve 50 and the secondary regulator valve 60. The manual valve 45 is formed with an input port 45a that is input with the line pressure PL, a Drive-position (D-position) output port 45b, and a Reverse-position (R-position) output port 45c, and the like. The manual valve 45 opens and closes each port in association with the operation of the shift lever 91. The linear solenoid SLC1 is input with operation oil that is output from the D-position output port 45b of the manual valve 45 through an input port 112. By discharging to a drain port 116, the linear solenoid SLC1 regulates the pressure of the operation oil and outputs the operation oil from an output port 114. The electromagnetic pump 100 intakes operation oil through an intake port 102 from an oil passage 46 between the strainer 41 and the mechanical oil pump 42, and discharges from a discharge port 104. The switching valve 70 switches between the following two states: a state in which operation oil output from the linear solenoid SLC1 is delivered to an oil passage 48 of the clutch C1, and operation oil from the discharge port 104 of the electromagnetic pump 100 is delivered to a lubricating oil passage 68; and a state in which the supply of operation oil from the linear solenoid SLC1 to the oil passage 48 of the clutch C1 is cut off, and operation oil from the discharge port 104 is delivered to the oil passage 48 of the clutch C1. The lock-up relay valve 80 uses the secondary pressure PS from the secondary regulator valve 60 to lock up the torque converter 21 and release the locked-up torque converter 21. The cooler CO is connected to an oil passage 88 of the lock-up relay valve 80 through a check valve 89. The bypass valve 87 bypasses the cooler CO and drains operation oil output from the lock-up relay valve 80 to the oil passage 88. Note that FIG. 3 only shows the hydraulic system of the clutch C1, and does not show the hydraulic systems for the clutches C2, C3 or the brakes B1, B2 because they are not central to the present invention. These hydraulic systems may be configured using common linear solenoids or the like.

Here, the operation oil delivered to the lubricating oil passage 68 is supplied to functional components provided in the automatic transmission 30, such as the clutches C1 to C3, the brakes B1, B2, the gear mechanism 27, the differential gear 28, and bearings for rotatably supporting each rotating shaft. After lubricating these, the operation oil returns again to an oil pan.

As shown in FIG. 3, the primary regulator valve 50 is formed from a sleeve 52, a spool 54 that slides in the axial direction inside the sleeve 52, and a spring 56 that biases the spool 54 in the axial direction. The sleeve 52 is formed with various ports: a signal pressure input port 52a that is input with an output pressure as a signal pressure from the linear solenoid SLT; a feedback input port 52b that is connected to an oil passage 44, to which the line pressure PL is output by the mechanical oil pump 42, and input with the line pressure PL as a feedback pressure; an input port 52c that is connected to the oil passage 44; an output port 52d that is connected to the oil passage 58 linked to the secondary regulator valve 60; and a drain port 52e. In the primary regulator valve 50, an oil amount output from the input port 52c through the output port 52d increases as the spool 54 moves downward in the figure. If the spool 54 moves further downward, operation oil is drained from the input port 52c through the drain port 52e, which lowers the hydraulic pressure from the mechanical oil pump 42 and regulates the line pressure. The spool 54 is biased upward in the figure by the spring force of the spring 56 and the hydraulic pressure acting on the signal pressure input port 52a, and biased downward in the figure by the line pressure PL acting on the feedback input port 52b. Therefore, the line pressure PL increases as the hydraulic pressure acting on the signal pressure input port 52a increases.

As shown in FIG. 3, the secondary regulator valve 60 is formed from a sleeve 62, a spool 64 that slides in the axial direction inside the sleeve 62, and a spring 66 that biases the spool 64 in the axial direction. The sleeve 62 is formed with various ports: a signal pressure input port 62a that is input with the output pressure as a signal pressure from the linear solenoid SLT; a feedback input port 62b that is connected to the oil passage 58 and input with the secondary pressure PS as a feedback pressure; an input port 62c that is connected to the oil passage 58; an output port 62d that is connected to the lubricating oil passage 68; and a drain port 62e. In the secondary regulator valve 60, an oil amount output from the input port 62c through the output port 62d increases as the spool 64 moves downward in the figure. If the spool 64 moves further downward, operation oil is drained from the input port 62c through the drain port 62e, which lowers the hydraulic pressure from the primary regulator valve 50 and regulates the secondary pressure PS. The spool 64 is biased upward in the figure by the spring force of the spring 66 and the hydraulic pressure acting on the signal pressure input port 62a, and biased downward in the figure by the secondary pressure PS acting on the feedback input port 62b. Therefore, the secondary pressure PS increases as the hydraulic pressure acting on the signal pressure input port 62a increases.

As shown in FIG. 3, the switching valve 70 is formed from a sleeve 72, a spool 74 that slides in the axial direction inside the sleeve 72, and a spring 76 that biases the spool 74 in the axial direction. The sleeve 72 is formed with various ports: a signal pressure input port 72a that is input with the line pressure PL as a signal pressure; an input port 72b that is connected to the output port 114 of the linear solenoid SLC1; an input port 72c that is connected to the discharge port 104 of the electromagnetic pump 100; an output port 72d that is connected to the oil passage 48 of the clutch C1; and a drain port 72e that is connected to the lubricating oil passage 68. When the line pressure PL is input to the signal pressure input port 72a of the switching valve 70, the spool 74 overcomes the biasing force of the spring 76 to move to the position shown in the left-hand region of the figure. Consequently, communication between the input port 72c and the output port 72d is cut off, the input port 72b communicates with the output port 72d, and the input port 72c communicates with the output port 72e. Thus, the output port 114 of the linear solenoid SLC1 communicates with the oil passage 48 of the clutch C1, communication is cut off between the discharge port 104 of the electromagnetic pump 100 and the oil passage 48 of the clutch C1, and the discharge port 104 communicates with the lubricating oil passage 68. When the line pressure PL is not input to the signal pressure input port 72a, the biasing force of the spring 76 causes the spool 74 to move to the position shown in the right-hand region of the figure. Consequently, communication is cut off between the input port 72b and the output port 72d, the input port 72c communicates with the output port 72d, and communication is cut off between the input port 72c and the output port 72e. Thus, communication is cut off between the output port 114 of the linear solenoid SLC1 and the oil passage 48 of the clutch C1, the discharge port 104 of the electromagnetic pump 100 communicates with the oil passage 48 of the clutch C1, and communication is cut off between the discharge port 104 and the lubricating oil passage 68.

As shown in FIG. 3, the lock-up relay valve 80 is formed from a sleeve 82, a spool 84 that slides in the axial direction inside the sleeve 82, and a spring 86 that biases the spool 84 in the axial direction. The sleeve 82 is formed with various ports: a signal pressure input port 82a that is input with a signal pressure from a linear solenoid PSLU (not shown); an input port 82b that is connected to the oil passage 58 of the secondary regulator valve 60; an input port 82c that is similarly connected to the oil passage 58; an output port 82d that is connected to a converter chamber port 22a of the torque converter 21; an output port 82e that is connected to a lock-up chamber port 22b; an output port 82f that is connected to the oil passage 88 linked to the cooler CO; and an input port 82g that is connected to the lubricating oil passage 68. When the signal pressure from the linear solenoid PSLU is input to the signal pressure input port 82a of the lock-up relay valve 80, the spool 84 overcomes the biasing force of the spring 86 to move to the position shown in the right-hand region of the figure. Consequently, the input port 82b communicates with the output port 82d, and the input. port 82g communicates with the output port 82f. Thus, the oil passage 58 supplied with the secondary pressure PS is connected to the converter chamber port 22a of the torque converter 21, and the lubricating oil passage 68 is connected to the oil passage 88 linked to the cooler CO. Accordingly, operation oil is guided to the converter chamber port 22a such that the torque converter 21 locks up, and a portion of the operation oil supplied to the lubricating oil passage 68 is delivered to the cooler CO through the lock-up relay valve 80. When the signal pressure from the linear solenoid PSLU is not input to the signal pressure input port 82a of the lock-up relay valve 80, the biasing force of the spring 86 causes the spool 84 to move to the position shown in the left-hand region of the figure. Consequently, the input port 82c communicates with the output port 82e, and the input port 82d communicates with the output port 82f. Thus, the oil passage 58 supplied with the secondary pressure PS is connected to the lock-up chamber port 22b of the torque converter 21, and the oil passage 88 linked to the cooler CO is connected to the converter chamber port 22a. Accordingly, operation oil circulates in the order from the lock-up chamber port 22b to the converter chamber port 22a, such that the torque converter 21 is released from lock-up, and operation oil discharged from the converter chamber port 22a of the torque converter 21 is delivered to the cooler CO through the lock-up relay valve 80.

When the automobile 10 of the embodiment thus formed is running with the shift lever 91 in the Drive (D) running position, based on the accelerator opening from the accelerator pedal position sensor 94 and the vehicle speed from the vehicle speed sensor 98, a target shift speed is set using a shift map. Based on the set target shift speed, the corresponding clutches C1 to C3 and brakes B1, B2 are engaged and disengaged so as to drivingly control the hydraulic circuit 40 (linear solenoid SLT, linear solenoid SLC1, and the like).

Furthermore, when the automobile 10 of the embodiment is running with the shift lever 91 in the Drive (D) running position, the engine 12 automatically stops when all preset automatic stop conditions are satisfied. Such automatic stop conditions include the vehicle speed V being zero, the accelerator off, and the brake switch signal BSW on. Once the engine 12 automatically stops, if preset automatic start conditions such as the brake switch signal BSW being off are subsequently satisfied, the automatically stopped engine 12 is automatically started.

Figure 4:
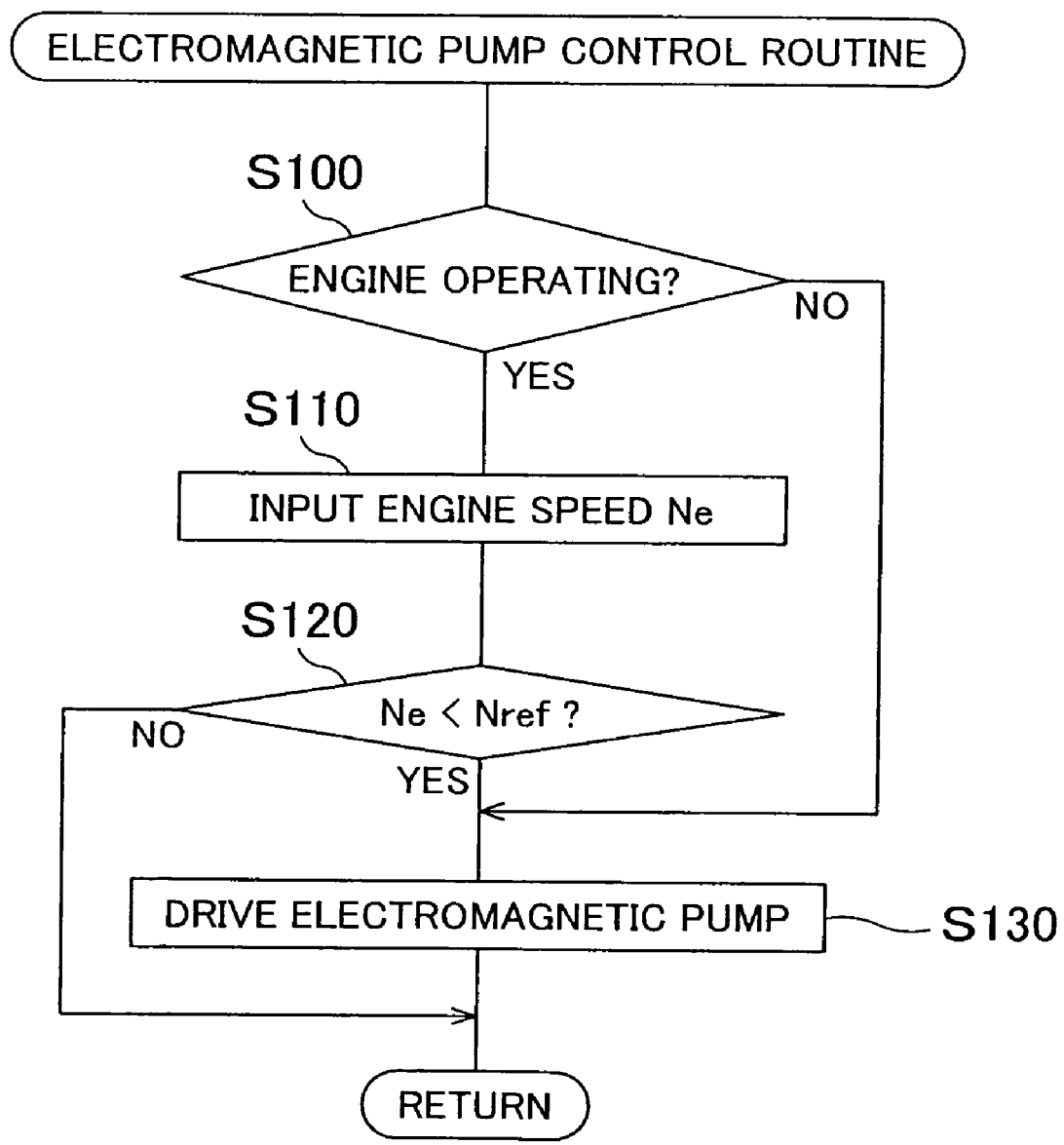
FIG. 4 is a flowchart that shows an example of an electromagnetic pump control routine, executed by an AT ECU 29.

The operation of the power transmission device 20 of the embodiment, and more particularly the operation of the electromagnetic pump 100, will be described next. FIG. 4 is a flowchart that shows an example of an electromagnetic pump control routine executed by the AT ECU 29 of the embodiment. This routine is repeatedly executed at a predetermined timing (e.g. every several milliseconds, or every several tens of milliseconds).

When the electromagnetic pump control routine is executed, a CPU of the AT ECU 29 first determines whether the engine 12 is operating (step S100). If the engine 12 is not operating, that is, if the engine 12 has automatically stopped, a solenoid portion 110 is controlled such that operation oil is pressure fed from the electromagnetic pump 100 (step S130). The present routine is then ended. When the automatic stop conditions are satisfied and the engine 12 automatically stops, the mechanical oil pump 42 also stops accordingly. Therefore, the line pressure PL escapes and the spool 74 of the switching valve 70 cuts off communication between the output port 114 of the linear solenoid SLC1 and the oil passage 48 of the clutch C1, and communicates the oil passage 48 of the clutch C1 with the discharge port 104 of the electromagnetic pump 100. Thus, pressure feeding operation oil from the electromagnetic pump 100 causes hydraulic pressure to act on the clutch C1. When the automatic start conditions are subsequently satisfied and the engine 12 automatically starts, the mechanical oil pump 42 also operates accordingly. Therefore, the line pressure PL is delivered and the spool 74 of the switching valve 70 communicates the output port 114 of the linear solenoid SLC1 with the oil passage 48 of the clutch C1, and cuts communication between the oil passage 48 of the clutch C1 and the discharge port 104 of the electromagnetic pump 100. In such case, the line pressure PL input through the D-position output port 45b of the manual valve 45 is regulated by the linear solenoid SLC1 and supplied to the clutch C1, such that the clutch C1 becomes completely engaged and starts the vehicle moving. By driving the electromagnetic pump 100 so that hydraulic pressure acts on the clutch C1 while the engine 12 is automatically stopped, the clutch C1 can be rapidly engaged by the linear solenoid SLC1 immediately after the engine 12 automatically restarts. Therefore, the vehicle can smoothly start off as the result of automatic starting of the engine 12. Note that in this embodiment, the electromagnetic pump 100 is set so as to pressure feed an amount of operation oil capable of replenishing only an amount of operation oil leakage from a seal ring or the like provided between the piston and drum of the clutch C1.

On the other hand, if it is determined that the engine 12 is operating, the engine speed Ne from the rotation speed sensor is input through communication from the engine ECU 16 (step S110). If the input engine speed Ne is less than a predetermined value Nref, the solenoid portion 110 is drivingly controlled such that operation oil is pressure fed from the electromagnetic pump 100 (step S130). The present routine is then ended. When the engine 12 is operating, the mechanical oil pump 42 is operated using power from the engine 12 to generate the line pressure PL, and the spool 74 of the switching valve 70 communicates the discharge port 104 of the electromagnetic pump 100 with the lubricating oil passage 68. Therefore, operation oil can be delivered to the lubricating oil passage 68 by pressure feeding operation oil from the electromagnetic pump 100. Here, the predetermined value Nref is set as an engine speed threshold at which operation oil can no longer be sufficiently supplied from the mechanical oil pump 42 to the lubricating oil passage 68. For example, the predetermined value Nref may be set to 1,000 rpm, 1,200 rpm, 1,400 rpm or the like depending on the specifications of the mechanical oil pump 42 and the hydraulic circuit 40. Note that if the engine speed Ne is equal to or greater than the predetermined value Nref, it is determined that operation oil can be sufficiently supplied from the mechanical oil pump 42 to the lubricating oil passage 68. Consequently, the electromagnetic pump 100 is stopped and the present routine ended.

Figure 5:
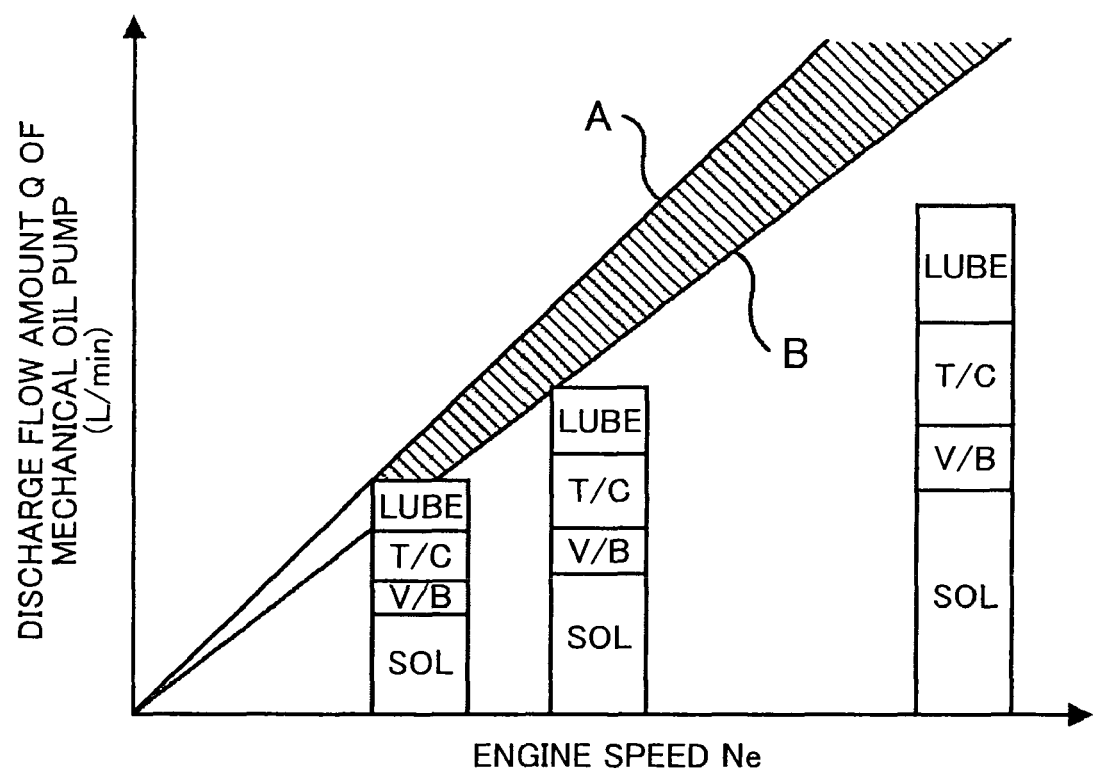
FIG. 5 is an explanatory drawing that shows the relationship between an engine speed Ne and a discharge flow amount Q of a mechanical oil pump 42.

FIG. 5 shows the relationship between the engine speed Ne and a discharge flow amount Q of the mechanical oil pump 42. As described above, in the primary regulator valve 50, the line pressure PL is regulated from operation oil that is pressure fed from the mechanical oil pump 42, and such regulating is accompanied by delivering at least a portion of such operation oil to the oil passage 58. In the secondary regulator valve 60, the secondary pressure is regulated from operation oil that is delivered to the oil passage 58, and such regulating is accompanied by delivered at least a portion of such operation oil to the lubricating oil passage 68. Therefore, when the speed of the engine 12 is low and little operation oil is pressure fed from the mechanical oil pump 42, there is also less operation oil supplied to the lubricating oil passage 68. For this reason, the mechanical oil pump 42 is normally designed with a discharge capacity such that the minimum operation oil required for the functional components (the clutches C1 to C3, the brakes B1, B2, the gear mechanism 27, the differential gear 28 and so on) of the automatic transmission 30 is supplied to the lubricating oil passage 68 even when the engine speed Ne is low (see line A in the figure). However, when the engine speed Ne increases, the discharge capacity becomes excessive. In the embodiment, the discharge port 104 of the electromagnetic pump 100 is connected to the lubricating oil passage 68 through the switching valve 70. When the engine speed Ne is less than the predetermined value Nref and less operation oil is pressure fed from the mechanical oil pump 42, operation oil is pressure fed from the electromagnetic pump 100 to deliver operation oil to the lubricating oil passage 68, which can correspondingly decrease the load on the mechanical oil pump 42 (see line B in the figure). Accordingly, a mechanical oil pump 42 with a relatively low capacity can be used, which enables downsizing of the mechanical oil pump 42. In the embodiment, the mechanical oil pump 42 is designed with a capacity such that the minimum required operation oil is supplied in consideration of leakage rates to the torque converter 21, the solenoids (the linear solenoid SLC1, the linear solenoid SLT and so on) and various valves provided in the hydraulic circuit 40 in addition to lubrication targets (the lubricating oil passage 68) while the engine 12 is idling.

According to the power transmission device 20 of the embodiment described above, the discharge port 104 of the electromagnetic pump 100 is connected to the oil passage 48 of the clutch C1 and the lubricating oil passage 68 through the switching valve 70. When the engine 12 is operating at less than the predetermined value Nref, the electromagnetic pump 100 is driven to deliver operation oil to the lubricating oil passage 68. Therefore, the load of the mechanical oil pump 42 that is driven by the power of the engine 12 can be correspondingly reduced to enable downsizing of the mechanical oil pump 42. As a consequence, a more compact device overall can be achieved. By downsizing the mechanical oil pump 42, the engine 12 can operate with greater efficiency to achieve better fuel efficiency. Furthermore, the electromagnetic pump 100 is driven while the engine 12 is automatically stopped so that hydraulic pressure from the electromagnetic pump 100 instead of the linear solenoid SLC1 acts through the switching valve 70 on the clutch C1 used for starting off. Therefore, the clutch C1 can be rapidly engaged by the linear solenoid SLC1 immediately after the engine 12 automatically restarts, and the vehicle can smoothly start off as the result of automatic starting of the engine 12. In addition, the supply of operation oil to the clutch C1 while the engine 12 is automatically stopped and the supply of operation oil to the lubricating oil passage 68 while the engine 12 is operating at less than the predetermined value Nref is performed by one electromagnetic pump 100 using the switching valve 70. Therefore, a more compact device overall can be achieved compared to a device that uses two electromagnetic pumps.

Figure 6:
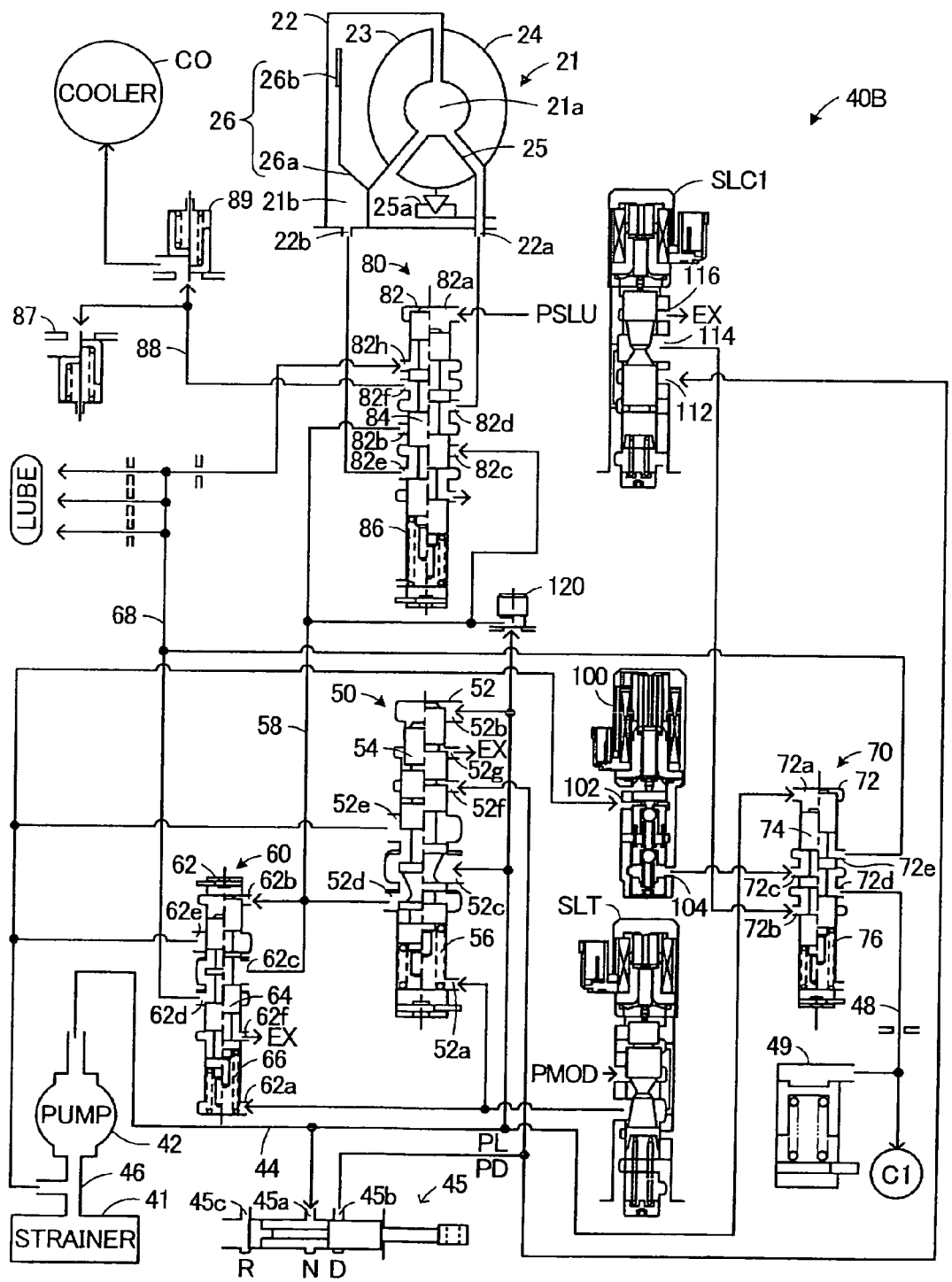
FIG. 6 is a structural diagram that shows an outline of the constitution of a hydraulic circuit 40B according to a modification.

In the power transmission device 20 of the embodiment, the input port 82c of the lock-up relay valve 80 is connected to the oil passage 58 so that the secondary pressure PS acts on the input port 82c. However, as shown in a hydraulic circuit 40B of a modification in FIG. 6, the line pressure PL in addition to the secondary pressure PS may act on the input port 82c through a check valve 120. Alternatively, the line pressure PL alone may act on the input port 82c.

In the power transmission device 20 of the embodiment, operation oil discharged in conjunction with the generation of the secondary pressure by the secondary regulator valve 60 is supplied to the lubricating oil passage 68. However, depending on the specifications of the hydraulic circuit, the lubricating oil passage may be supplied with operation oil that is discharged in conjunction with the generation of the line pressure PL by the primary regulator valve 50.

In the power transmission device 20 of the embodiment, one switching valve 70 is used to switch the connection of the oil passage connected to the output port 114 of the linear solenoid SLC1 and the oil passage connected to the discharge port 104 of the electromagnetic pump 100, with the oil passage 48 of the clutch C1 and the lubricating oil passage 68. However, two or more switching valves may be used for switching the connection between these oil passages.

In the power transmission device 20 of the embodiment, the torque converter 21 is provided as an example of a fluid transmission device. However, the present invention is not limited to the torque converter 21 and a fluid coupling may be used instead of the torque converter 21, provided that it is capable of transmitting power using operation fluid.

In the power transmission device 20 of the embodiment, the switching valve 70 is driven using the line pressure PL. However, the switching valve 70 may be driven using a modulator pressure PMOD achieved by lowering the line pressure PL with a modulator valve (not shown). Alternatively, the line pressure PL or a modulator pressure may be supplied to the switching valve 70 through a solenoid valve, and the solenoid valve used to drive the switching valve 70.

The power transmission device 20 of the embodiment incorporates a four-speed automatic transmission 30 with first to fourth forward speeds. However, the present invention is not limited to this example, and the power transmission device 20 may incorporate an automatic transmission with any number of speeds, such as a four-speed, six-speed, or eight-speed automatic transmission.

Here, the correspondence relation will be described between main elements in the embodiment and main elements of the invention as listed in the Summary of the Invention. In the embodiment, the engine 12 corresponds to a "motor"; the mechanical oil pump 42 to a "first pump"; the electromagnetic pump 100 to a "second pump"; the primary regulator valve 50 and the secondary regulator valve 60 to a "pressure regulating valve"; and the switching valve 70 to a "switching valve". Of the switching valve 70, the signal pressure input port 72a corresponds to a "signal pressure input port"; the input port 72b to a "first input port"; the input port 72c to a "second input port"; the output port 72 to a "first output port"; and the output port 72e to a "second output port". The AT ECU 29 corresponds to a "control unit". In addition, the primary regulator valve 50 corresponds to a "first pressure regulating valve" and the secondary regulator valve 60 corresponds to a "second pressure regulating valve". Here, the motor is not limited to an internal combustion engine that outputs power using a hydrocarbon fuel such as gasoline or diesel. The motor may be any type of internal combustion engine, such as a hydrogen engine, or any type of motor capable of power output, such as an electric motor other than an internal combustion engine. The second pump is not limited to an electromagnetic pump that pressure feeds operation oil using electromagnetic force. The second pump may be any type of pump that is driven by power to generate fluid pressure, such as an electric pump that pressure feeds operation oil using power from an electric motor. In addition, the second pump is not limited to one that pressure feeds operation fluid to the clutch C1 which forms the first forward speed. For example, when a shift speed other than the first forward speed (such as the second forward speed) is set at start-off based on a driver instruction or the running condition, the second pump may pressure feed operation oil to a clutch or brake that forms this speed. Note that with regard to the correspondence relation between the main elements of the embodiment and the main elements of the invention as listed in the Summary of the Invention, the embodiment is only an example for giving a specific description of a best mode for carrying out the invention explained in the Summary of the Invention. This correspondence relation does not limit the elements of the invention as described in the Summary of the Invention. In other words, any interpretation of the invention described in the Summary of the Invention shall be based on the description therein; the embodiment is merely one specific example of the invention described in the Summary of the Invention.

The above embodiment was used to describe a mode for carrying out the present invention. However, the present invention is not particularly limited to such an example, and may obviously be carried out using various embodiments without departing from the scope of the present invention.

The present invention may be used in the automobile industry and the like.

What is claimed is:

1. A power transmission device installed in a vehicle, comprising:
   a clutch that transmits power from a motor to an axle;
   a first pump that is driven by power from the motor to generate and output fluid pressure;
   a second pump that receives and is driven by a supply of electric power to generate and output fluid pressure;
   a pressure regulating valve that regulates a pressure of operation fluid output from the first pump, and delivers at least a portion of operation fluid discharged in connection with the pressure regulation to a lubrication target for use as lubricant; and
   a switching valve that switches between a first connection state, wherein when the first pump is driving, operation fluid output from the pressure regulating valve is supplied to the clutch and operation fluid output from the second pump is supplied as lubricant to the lubrication target while a supply of operation fluid from the second pump to the clutch is cut off, and a second connection state wherein, when the first pump is not driving, the supply of operation fluid from the pressure regulating valve to the clutch is cut off and operation fluid output from the second pump is supplied to the clutch while the supply of operation fluid from the second pump to the lubrication target is cut off.

2. The power transmission device according to claim 1, further comprising:
   a control unit that, while the motor is operating, drivingly controls the second pump such that operation fluid is supplied from the second pump to the lubrication target when a rotation speed of the motor is less than a predetermined value, and stops the second pump when the rotation speed of the motor is equal to or greater than the predetermined value.

3. The power transmission device according to claim 1, further comprising:
   a fluid transmission device that transmits power using operation fluid inside an operation fluid chamber, wherein
   the pressure regulating valve is formed from a first pressure regulating valve that generates a line pressure for engaging the clutch and supplies at least a portion of operation fluid discharged in connection with the line pressure generation to an oil passage connected to the operation fluid chamber, and a second pressure regulating valve that regulates a pressure of operation fluid supplied from the first pressure regulating valve to the oil passage and supplies at least a portion of operation fluid discharged in connection with the pressure regulation to the lubrication target for use as lubricant.

4. The power transmission device according to claim 1, wherein
   the switching valve comprises:
   a signal pressure input port that is input with operation fluid output from the first pump;
   a first input port that is input with operation fluid output from the pressure regulating valve;
   a second input port that is input with operation fluid output from the second pump;
   a first output port that outputs operation fluid to the clutch; and
   a second output port that outputs operation fluid to the lubrication target, wherein
   when fluid pressure is acting on the signal pressure input port, as the first connection state, the first input port is connected to the first output port, the connection between the second input port and the first output port is cut off, and the second input port is connected to the second output port, and
   when fluid pressure is not acting on the signal pressure input port, as the second connection state, the connection between the first input port and the first output port is cut off, the second input port is connected to the first output port, and the connection between the second input port and the second output port is cut off.

5. The power transmission device according to claim 1, wherein
   the second pump is an electromagnetic pump that generates fluid pressure using electromagnetic force.

6. The power transmission device according to claim 1, wherein
   the motor is an internal combustion engine capable of an automatic stop and an automatic start.

7. A vehicle installed with
   a motor, and
   the power transmission device according to claim 1.

* * * * *